July 29, 1952 P. W. HERRLINGER 2,604,783
DEVICE FOR TESTING GUMMED TAPE
Filed Jan. 27, 1950 2 SHEETS—SHEET 1
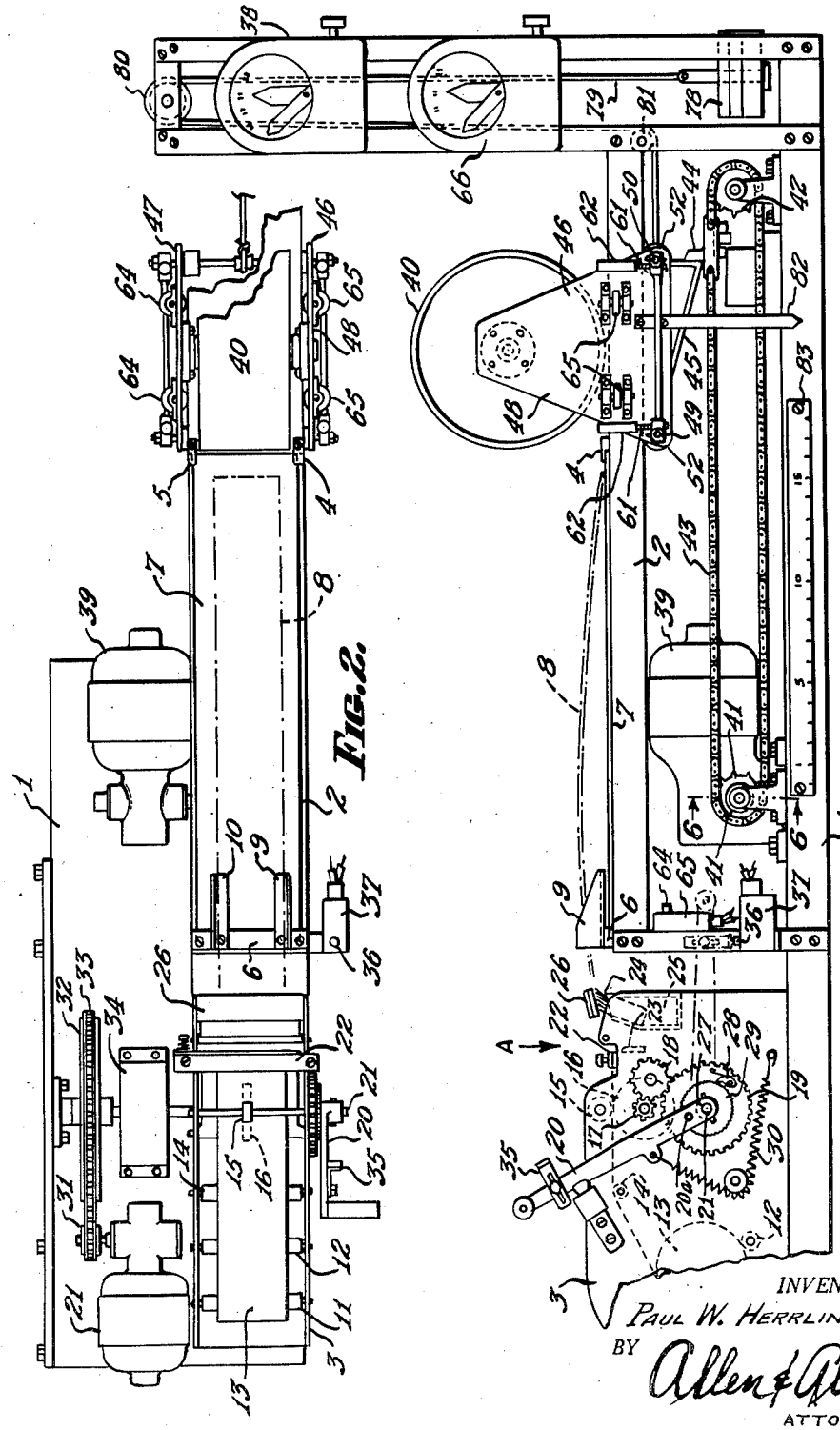
INVENTOR.
PAUL W. HERRLINGER,
BY Allen & Allen
ATTORNEYS.

July 29, 1952 P. W. HERRLINGER 2,604,783
DEVICE FOR TESTING GUMMED TAPE
Filed Jan. 27, 1950 2 SHEETS—SHEET 2
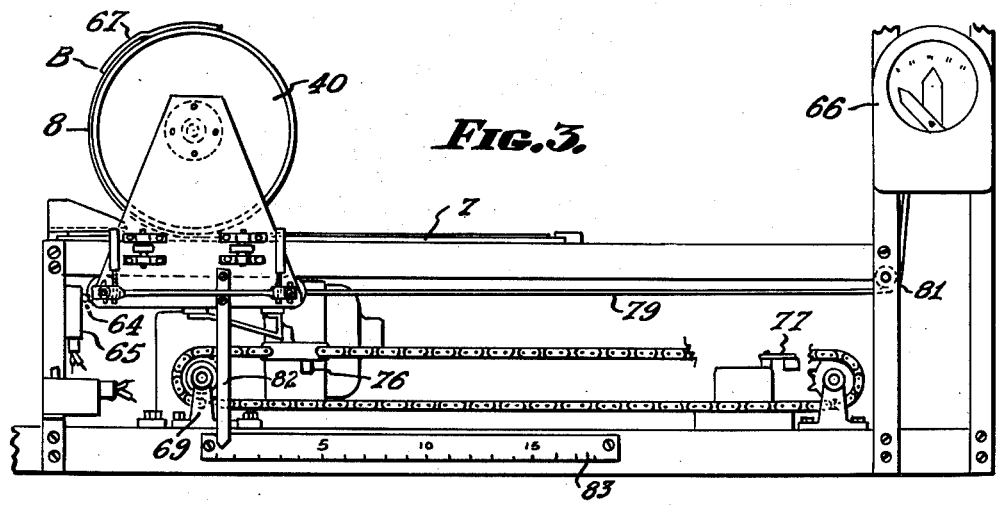
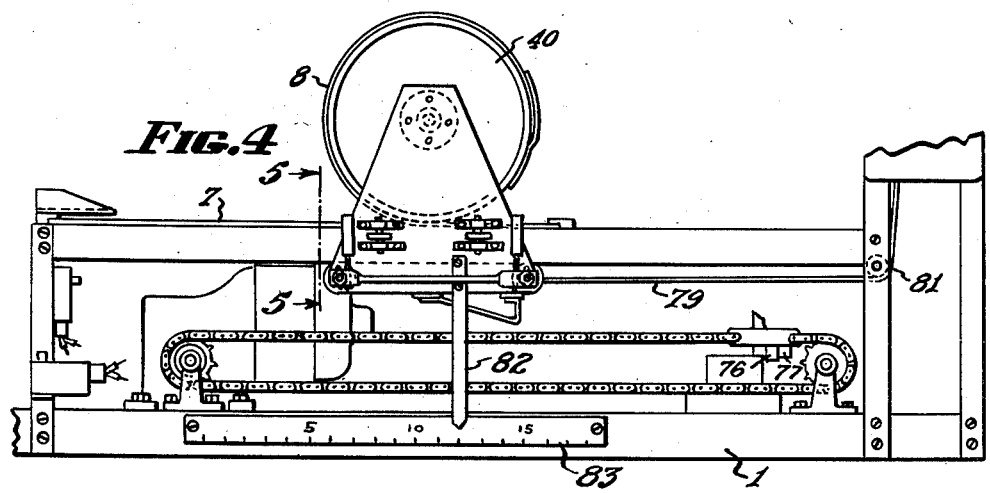
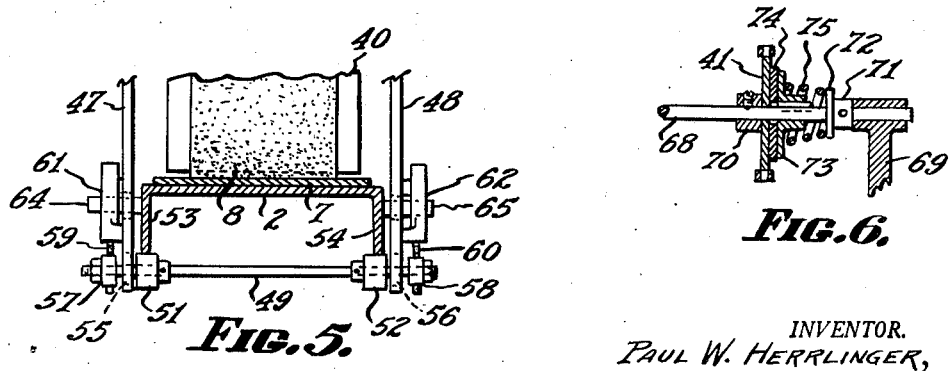
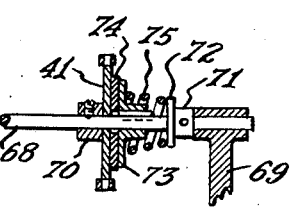
INVENTOR.
PAUL W. HERRLINGER,
BY
ATTORNEY Patented July 29, 1952

2,604,783

UNITED STATES PATENT OFFICE 2,604,783

DEVICE FOR TESTING GUMMED TAPE

Paul W. Herrlinger, Troy, Ohio, assignor to The Gummed Products Company, Troy, Ohio, a corporation of Ohio Application January 27, 1950, Serial No. 140,809

12 Claims. (Cl. 73—150)

My invention has to do with a machine for testing the wet adhesive strength of gummed tape. More particularly, my invention relates to testing and measuring the wet adhesive tensile strength of gummed tape adhered to a preselected sealing surface.

Currently the recognized test for determining adhesive value of gummed tape is to measure the sheer strength or resistance to slide of the moistened gum and thus arrive at a value for wet tack. I have found that although this method is valuable particularly for control purposes it does not give a complete picture regarding the overall quality of a given gummed tape. In contrast to the currently recognized method, my machine measures the wet tensile strength of the gum and makes possible the collection of values over a wider range of conditions thus enabling the user to make a much more complete analysis of the wet characteristics of a given adhesive.

In addition to the fact that my machine will give an accurate measure of the wet tensile strength of the gum under consideration, it will become evident as this description proceeds that my machine is an extremely versatile unit capable of producing a wide variety of conditions which heretofore it has not been possible to produce.

It is a principal object of my invention to provide a machine for accurately testing the wet adhesive strength of gummed tape under varying condiitons of use over a wide range.

It is an object of my invention to provide means for measuring the wet tensile strength of the tape gumming under consideration under controlled conditions simulating actual operating conditions whereby the characteristics of the tape may be studied.

It is a further object of my invention to provide a tape testing machine by means of which the tape will be applied to a pre-selected sealing surface at constant speed and under constant pressure; and wherein the time interval between the time the tape is adhered to the sealing surface and the time at which the tape is stripped from the sealing surface may be accurately controlled.

A further object of my invention is the provision of a testing device including a tape dispenser for depositing a length of tape to be tested on a sealing surface and incorporating means for controlling the time interval between the dispensing of the tape and its application to the sealing surface. Ancillary to this objective, I provide power driven means to operate the tape dispenser at a fixed speed thereby eliminating a variable inherent in hand operated dispensers.

Yet another object is the provision of a testing device the operation of which is free of possible human variation whereby tests may be repeated with the assurance that each test will be under identical conditions. In this manner standardizing information can be accurately obtained.

These and other objects of my invention which will be set forth hereinafter or will be apparent to one skilled in the art upon reading these specifications, I accomplish by that procedure and that construction and arrangement of parts of which I shall now describe an exemplary embodiment. Reference is made to the accompanying drawings wherein:

Figure 1 is a side elevational view of my testing device, parts of the dispenser being removed to show its mode of operation.

Figure 2 is a partial plan view of the testing device illustrated in Figure 1.

Figures 3 and 4 are partial elevational views of my testing device in various operating positions.

Figure 5 is a sectional view taken along line 5—5 of Figure 4 and illustrates the roller carriage mechanism.

Figure 6 is a sectional view taken along the line 6—6 of Figure 1 and illustrates one type of clutch mechanism which may be employed in my device.

In Figure 1, I have shown a base 1 upon which is mounted the table 2 and the tape dispenser 3, the table being so arranged that it will receive a length of tape directly from the dispenser. The table 2 is provided with holders 4, 5 and 6 which serve to position a standard piece of corrugated boxboard or other preselected sealing surface 7 to which a test strip of tape 8 (indicated in broken lines) will be applied. Guide bars 9 and 10 may be provided to direct the length of tape 8 onto the testing surface 7.

The tape dispenser 3 is of standard construction and comprises a pair of supporting rollers 11 and 12 upon which the tape roll 13 rests. The tape passes over roller 14 and then between wheels 15 and 16, the wheel 16 being driven through the gears 17, 18 and 19 either by the hand lever 20 or the motor 21. The dispenser is provided with a cutting bar 22 and knife 23, as well as conventional brush 24 and water tank 25 for moistening the tape. A hinged hold-down plate 26 assures positive contact of the tape with the brush 24.

The hand lever 20 of the dispenser is pinned to the shaft 27 which carries the gear 19. The gear 19, however, is freely movable on the shaft 27 and is driven by the pawl 28 and ratchet wheel 29, the latter being pinned at 20a to the lever 20. Thus, when the lever 20 is moved from left to right, the ratchet wheel 29 will be engaged by pawl 28 thereby driving gear 19 and hence causing wheel 16 to dispense a length of tape. At the end of its left to right movement the lever 20 will activate means (not shown) to cause the knife 23 to sever the tape, whereupon on release of the lever 20, the lever will return to starting position under the influence of spring 30. During the return movement of lever 20 the pawl 28 will ride over the teeth of ratchet wheel 29 and hence will not affect the gear 19. Thus the dispensing wheel 16 will not be moved during return movement of the lever 20.

Alternatively, the shaft 27 may be driven by the motor 21 acting through the sprockets 31 and 32, the chain 33 and clutch 34. Since the lever 20 is pinned to the shaft 27, the lever will be moved in the same manner as if it were hand operated, this being necessary because the lever carries an abutment 35 for contact with button 36 of starting switch 37. The electrical circuit for the motor 21 is arranged so that the power will be cut off as the lever 20 arrives at its forward position.

The starting switch 37, which is activated by the lever 20 at the end of its forward motion, starts the timer 38 which controls the time interval between the dispensing of the tape and application thereof to the sealing surface 7. This time interval corresponds to the time consumed by the tape user in getting a length of tape from the dispenser to the package being sealed. Since this time interval varies with the individual user and the taping operations, and since the all over performance of gummed tape is affected by the length of time between moistening and application, the timer 38 provides a means whereby this variable may be accurately studied. At the conclusion of a predetermined interval, the timer 38 activates gearhead motor 39, causing tape roller 40 to travel to the left over the length of tape 8. The right to left motion of the roller presses the tape onto the sealing surface. The tape roller 40 is driven forward by motor 39 acting through the sprockets 41 and 42, chain 43, with dog 44 contacting the depending abutment 45 of the roller carriage 46.

In Figure 5 I have shown in detail the construction of the carriage 46. It comprises a pair of side members 47 and 48 between which the roller 40 is rotatably mounted, the lower side of the roll 40 resting on the table 2. The bottom edges of the side members 47 and 48 extend below the table 2 where they are joined by the shafts 49 and 50 carrying rollers 51 and 52 which run along the downturned flanges 53 and 54 of the table 2. The shafts 49 and 50 extend through the elongated openings 55 and 56 in the side members and are adjustable vertically by means of blocks 57 and 58, threaded rods 59 and 60 and adjustment heads 61 and 62. Springs may be located in the heads 61 and 62 to provide a light tension on rollers 51 and 52 for guiding purposes. Pairs of horizontal rollers 64 and 65 are also provided to maintain proper alignment of the tape roller relative to the sides of table 2.

When the motor 39 is started by the action of timer 38, the carriage 46 is moved to the left under the influence of dog 44 carried on chain 43 thereby moving the roller 40 and pressing the tape onto the sealing surface. The speed of the roller is controlled by the motor 39 and is preferably constant. As the tape roller 40 reaches the position illustrated in Figure 3 the leading end of the carriage contacts button 64 of switch 65, which starts timer 66, as well as cutting off power to motor 39. The timer 66 serves to control the time interval between application of the tape and return movement of the roller 40. During this time interval the free end of the length of tape 8, which has been cut at point A by the knife 23, is quickly drawn from the dispenser and fastened with a small length of adhesive tape 67 or the like to the roller 40, substantially as shown at D in Figure 3. The manner in which the tape is fastened to the roller does not, however, constitute a limitation on my invention and any suitable means could be employed, as for example clamping means countersunk in the rolling surface of the roller.

In order to prevent strain upon the driving mechanism at the instant carriage 46 contacts switch 65, I provide the driven sprocket 41 with a clutch which will permit slippage of the parts when normal movement of the sprocket is inhibited. As seen in Figure 6, the sprocket 41 is carried on a shaft 68 supported by the bearing 69. The sprocket 41 is loosely fitted on the shaft 68 but is held from axial movement on one side by the collar 70 and on the other by a second collar 71 having a flange 72. Both of the collars are fixed to the shaft 68. An axially slidable clutch plate 73 having a bearing face 74 of leather or other suitable material is keyed to the shaft 68 between the collar 71 and the sprocket 41, with the bearing face 74 of the clutch plate being urged into contact with the sprocket 41 by the compression spring 75 biased between clutch plate 73 and collar 71. This arrangement, as will be evident, permits the clutch plate to slip when movement of the chain is inhibited thereby preventing possible damage to the moving parts of the device.

At the conclusion of the time interval determined by timer 66, the timer will cause the motor 39 to be reversed and the chain driven in the reverse direction thereby causing dog 44 to be quickly returned to its starting position. A companion dog 76 carried by the chain will contact limit switch 77 as the dogs reach the starting position, bringing the powered portion of the machine to rest.

The instant dog 44 is moved out of contact with bracket 45, the roller 40 is released from the powered portion of the machine and comes under the influence of the weight load 78 (Fig. 1), the load being transmitted to the roller 40 by cord 79 passing over pulley wheels 80 and 81. The weight load 78 is arranged so as to be moved upwardly as the roller 40 is moved forward on the table, and upon release of the roller and carriage, the assembly becomes a free moving body, the weight load acting under the influence of gravity to move the roller backward over the table. In this way the only deterrent to the backward motion of the roller is the strength of the wet gumming on the tape in contact with the sealing surface. If the weight load is sufficiently great, it will overcome the adhesive bond and strip a portion at least of the tape from the sealing surface. The extent of the backward motion of the roller and hence the amount of tape stripped from the sealing surface is measured by the pointer 82 carried by the carriage and the calibrated scale 83 fixed to the frame 1.

The mode of operation of my machine involved in making a thorough study of the strength characteristics of tape gumming should be readily understood from the foregoing description, and it should be apparent also that modifications may be made without departing from the spirit of my invention and I do not intend to be limited in the application of my invention other than as set forth in the claims which follow. For example, while I have employed timing means for controlling the time intervals between the dispensing of the tape and its application to the sealing surface, and the interval between the application and attempted removal from the sealing surface, it would also be possible to provide means to measure the time required for the backward or withdrawal motion of the roller to reach its limit, and hence add an additional variable which may be studied.

Having thus described my invention, what I desire to secure by Letters Patent is:

1. A device for testing the wet tensile strength of tape gumming comprising a support for a sealing surface, a roller mounted for reciprocal movement on said support, driving means for moving said roller forward over said support, means contacted by said roller at the end of its forward movement for releasing said roller from said driving means, and means for storing potential energy connected to said roller and operable upon release of said roller to move said roller backward over said support.

2. In a device for testing the wet tensile strength of tape gumming, a support for a sealing surface, a roller mounted for reciprocal movement on said support, driving means for moving said roller forward over said support, means contacted by said roller at the end of its forward movement to release said roller from said driving means, and means for storing potential energy connected to said roller and operable upon release of said driving means to move said roller backwards over said support, and tape dispensing means positioned to dispense a length of tape on said support in the path of said roller.

3. In a device for testing the wet tensile strength of tape gumming, a support for a sealing surface, a roller mounted for reciprocal movement on said support, driving means for moving said roller forward over said support to contact a length of tape to the sealing surface, a timer, means contacted by said roller at the end of its forward movement to start said timer, said timer serving at the expiration of a predetermined time interval to release said roller from said driving means, said roller becoming a free moving body, and means for storing potential energy connected to said roller tending when said roller is released to move said roller backward over said support.

4. In a device for testing the wet tensile strength of type gumming, a support for a sealing surface, a roller mounted for reciprocal movement on said support, driving means for moving said roller forward over said support to contact a length of tape to the sealing surface, a timer, means contacted by said roller at the end of its forward movement to start said timer, said timer serving to release said roller from said driving means at the expiration of a predetermined time interval, means for storing potential energy connected to said roller and tending when said roller is released to move said roller backward over said support, means for connecting a free end of the tape to said roller at the end of its forward movement so as to cause said tape to be carried by said roller during backward movement thereof, said tape being stripped from the sealing surface as the roller moves backward, and means for measuring the distance the tape is stripped from the sealing surface.

5. In a device for testing the wet tensile strength of tape gumming, a support for a sealing surface, tape applying means movably mounted on said support, means for moving said tape applying means to contact a length of tape with the sealing surface, and means for moving said tape applying means so as to strip the tape from the sealing surface, and means for measuring the distance the tape is stripped from the sealing surface.

6. In a device for testing the tensile strength of tape gumming, a support for a sealing surface, a roller mounted for reciprocal movement on said support, driving means for moving said roller over the sealing surface, dispensing means for depositing a length of tape in the path of said roller, means operable by said dispensing means to start said driving means and cause said roller to contact the length of tape with the sealing surface, means contacted by said roller at the end of its driven movement to release said roller from said driving means, means for storing potential energy connected to said roller to move it in the opposite direction, said last mentioned means tending to cause said tape to be stripped from the sealing surface, and means for measuring the distance the tape is stripped from the sealing surface.

7. In a device for testing the wet tensile strength of tape gumming, a support for a sealing surface, a roller mounted for reciprocal movement on said support, driving means for moving said roller over the sealing surface, tape dispensing means for dispensing a length of tape in the path of said roller, means operable by said tape dispensing means to start said driving means and cause said roller to contact the length of tape with the sealing surface, means engageable by said roller at end of its driven movement to release said roller from said driving means, means for storing potential energy connected to said roller to move it in the opposite direction, said last mentioned means tending to cause said tape to be stripped from the sealing surface, means for measuring the distance the tape is stripped from the sealing surface, and timing means for creating a controlled time interval between the contacting of the tape with the sealing surface and the release of the driving means.

8. In a device for testing the wet tensile strength of tape gumming, a support for a sealing surface, a roller mounted for reciprocal movement on said support, driving means for moving said roller over the sealing surface, tape dispensing means for dispensing a length of tape in the path of said roller, means operable by said tape dispensing means to start said driving means and cause said roller to contact the length of tape with the sealing surface, means engageable by said roller at end of its driven movement to release said roller from said driving means, means for storing potential energy connected to said roller to move it in the opposite direction, said last mentioned means tending to cause said tape to be stripped from the sealing surface, means for measuring the distance the tape is stripped from the sealing surface, timing means for creating a controlled time interval between the contacting of the tape with the sealing surface and the release of the driving means, and additional timing means for creating a controlled time interval between the dispensing of the tape and movement of the roller to contact the tape with the sealing surface.

9. A tape testing device for the purpose described comprising a frame, a table supported on said frame, a roller mounted for reciprocal movement on said table, driving means for moving said roller in one direction to apply a length of tape to a sealing surface, means for moving said roller in the opposite direction to strip the tape from the sealing surface, and means for measuring the amount of tape stripped from the sealing surface.

10. A tape testing device for the purposes described comprising a frame, a table supported on said frame, a roller mounted for reciprocal movement on said table, driving means for moving said roller in one direction to apply a length of tape to a sealing surface, means for moving said roller in the opposite direction to strip the tape from the sealing surface, timing means to control the time interval between application of the tape and movement of the roller in the opposite direction, and means for measuring the amount of tape stripped from the sealing surface.

11. A tape testing device for the purposes described comprising a frame, a table supported on said frame, a roller mounted for reciprocal movement on said table, driving means for moving said roller in one direction to apply a length of tape to a sealing surface, means for moving said roller in the opposite direction to strip the tape from the sealing surface, said last mentioned means comprising a weight load connected to said roller, and timing means to control the time interval between application of the tape and movement of the roller under the influence of said weight load.

12. In a device for testing the wet tensile strength of tape gumming, a support for a sealing surface, tape applying means mounted for forward movement on said support and return, said means being adapted to secure a length of gummed tape to the sealing surface when moved forward on said support, and for attachment to the end of the tape to strip the tape from the sealing surface when returned over said support, driving means for moving said tape applying means forward on said support at a predetermined rate of speed, and means for disengaging said driving means at the end of said forward movement, means for returning said tape applying means over said support under the influence of a predetermined force, said last mentioned means becoming operative on release of said driving means, and timing means activated by the movement of said tape applying means for determining the length of time the tape is in contact with the sealing surface.

PAUL W. HERRLINGER.

REFERENCES CITED

The following references are of record in the file of this patent:

UNITED STATES PATENTS

| Number | Name | Date |
|---|---|---|
| 1,000,613 | Lamberti | Aug. 15, 1911 |
| 1,231,580 | Edgecomb | June 3, 1917 |
| 2,051,464 | Bradner et al. | Aug. 18, 1936 |
| 2,338,129 | Moore | Jan. 4, 1944 |
| 2,390,510 | Chatten | Dec. 11, 1945 |
| 2,473,517 | Freedman | June 21, 1949 |

FOREIGN PATENTS

| Number | Country | Date |
|---|---|---|
| 476,520 | Great Britain | Dec. 10, 1937 |
| 551,126 | Great Britain | Feb. 9, 1943 |